United States Patent
Decrop et al.

(10) Patent No.: US 11,768,801 B2
(45) Date of Patent: Sep. 26, 2023

(54) DYNAMIC IDENTIFICATION OF CLOUD STORAGE DESTINATION FOR MULTI-USER FILES

(71) Applicant: INTERNATIONAL BUSINESS MACHINES CORPORATION, Armonk, NY (US)

(72) Inventors: Clement Decrop, Arlington, VA (US); Sarbajit K. Rakshit, Kolkata (IN); Martin G Keen, Cary, NC (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 17/453,347

(22) Filed: Nov. 3, 2021

(65) Prior Publication Data
US 2023/0138668 A1    May 4, 2023

(51) Int. Cl.
*G06F 16/00* (2019.01)
*G06F 16/11* (2019.01)
*G06F 16/185* (2019.01)
*G06F 21/62* (2013.01)
*G06F 16/188* (2019.01)
(Continued)

(52) U.S. Cl.
CPC .......... *G06F 16/122* (2019.01); *G06F 16/164* (2019.01); *G06F 16/185* (2019.01); *G06F 16/192* (2019.01); *G06F 21/62* (2013.01); *G06F 40/40* (2020.01)

(58) Field of Classification Search
None
See application file for complete search history.

(56) References Cited

U.S. PATENT DOCUMENTS

| 8,863,297 B2 | 10/2014 | Sharma |
| 10,776,755 B2 | 9/2020 | Newhouse |
| 10,847,157 B2 | 11/2020 | Eriksson |

(Continued)

FOREIGN PATENT DOCUMENTS

| CN | 109067840 A | 12/2018 |
| CN | 106095853 B | 11/2019 |

(Continued)

OTHER PUBLICATIONS

Anonymous, "IBM Cloud-Hybrid. Open. Resilient. Your platform and partner for digital transformation," IBM, Accessed: Sep. 9, 2021, https://www.ibm.com/cloud, 10 pages.

(Continued)

*Primary Examiner* — Tuankhanh D Phan
(74) *Attorney, Agent, or Firm* — Anthony M. Pallone

(57) ABSTRACT

According to one embodiment, a method, computer system, and computer program product for identifying cloud storage destination. The embodiment may include identifying content of a data file being created or updated. The embodiment may include identifying cloud storage criteria of the data file. The embodiment may include determining whether an existing storage solution within a cloud storage service provider (CSSP) knowledge corpus is applicable to the data file. In response to determining that an existing storage solution is not applicable to the data file, the embodiment may include creating a new storage solution for the data file based on the identified content and cloud storage criteria of the data file.

15 Claims, 5 Drawing Sheets

(51) Int. Cl.
*G06F 40/40* (2020.01)
*G06F 16/16* (2019.01)

(56) References Cited

U.S. PATENT DOCUMENTS

| | | | |
|---|---|---|---|
| 11,475,709 B2* | 10/2022 | Lafreniere | G06V 40/172 |
| 2017/0046531 A1 | 2/2017 | Roberts | |
| 2019/0251280 A1 | 8/2019 | Singh | |
| 2019/0281389 A1* | 9/2019 | Gordon | G06F 16/687 |
| 2019/0306240 A1 | 10/2019 | Crofton | |
| 2021/0112114 A1 | 4/2021 | Crofton | |
| 2022/0245267 A1* | 8/2022 | Vangala | G06N 5/022 |

FOREIGN PATENT DOCUMENTS

| | | |
|---|---|---|
| CN | 111599424 A | 8/2020 |
| KR | 101891498 B1 | 9/2018 |

OTHER PUBLICATIONS

Anonymous, "IBM Cloud Object Storage," IBM, Accessed: Sep. 9, 2021, https://www.ibm.com/cloud/object-storage?cm_sp=Cloud-Product-_-OnPageNavLink-IBMCloudPlatform_IBMObjectStorage-_-Storage_ProductBand, 11 pages.
Anonymous, "IBM Watson is AI for smarter business," IBM, Accessed: Sep. 9, 2021, https://www.ibm.com/watson, 9 pages.
Mell et al., "The NIST Definition of Cloud Computing", National Institute of Standards and Technology, Special Publication 800-145, Sep. 2011, 7 pages.

* cited by examiner

DYNAMIC IDENTIFICATION OF CLOUD STORAGE DESTINATION FOR MULTI-USER FILES

BACKGROUND

The present invention relates generally to the field of computing, and more particularly to cloud storage.

Cloud storage (CS) is a model of computer data storage in which digital data is stored in logical pools in an off-site location that is accessible either through the public internet or a dedicated private network connection. The physical storage may span multiple servers, sometimes in multiple locations, and the physical environment is typically owned and managed by a third-party cloud provider who manages and operates data storage as a service. The cloud storage service provider (CSSP) is responsible for keeping the data available and accessible on-demand, as well as keeping the physical environment secured and running. Cloud storage services may be accessed through a cloud computing service, a web service application programming interface (API), or by applications that utilize the API. Organizations may buy or lease storage capacity from a CSSP to store organization or application data.

SUMMARY

According to one embodiment, a method, computer system, and computer program product for identifying cloud storage destination. The embodiment may include identifying content of a data file being created or updated. The embodiment may include identifying cloud storage criteria of the data file. The embodiment may include determining whether an existing storage solution within a cloud storage service provider (CSSP) knowledge corpus is applicable to the data file. In response to determining that an existing storage solution is not applicable to the data file, the embodiment may include creating a new storage solution for the data file based on the identified content and cloud storage criteria of the data file.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
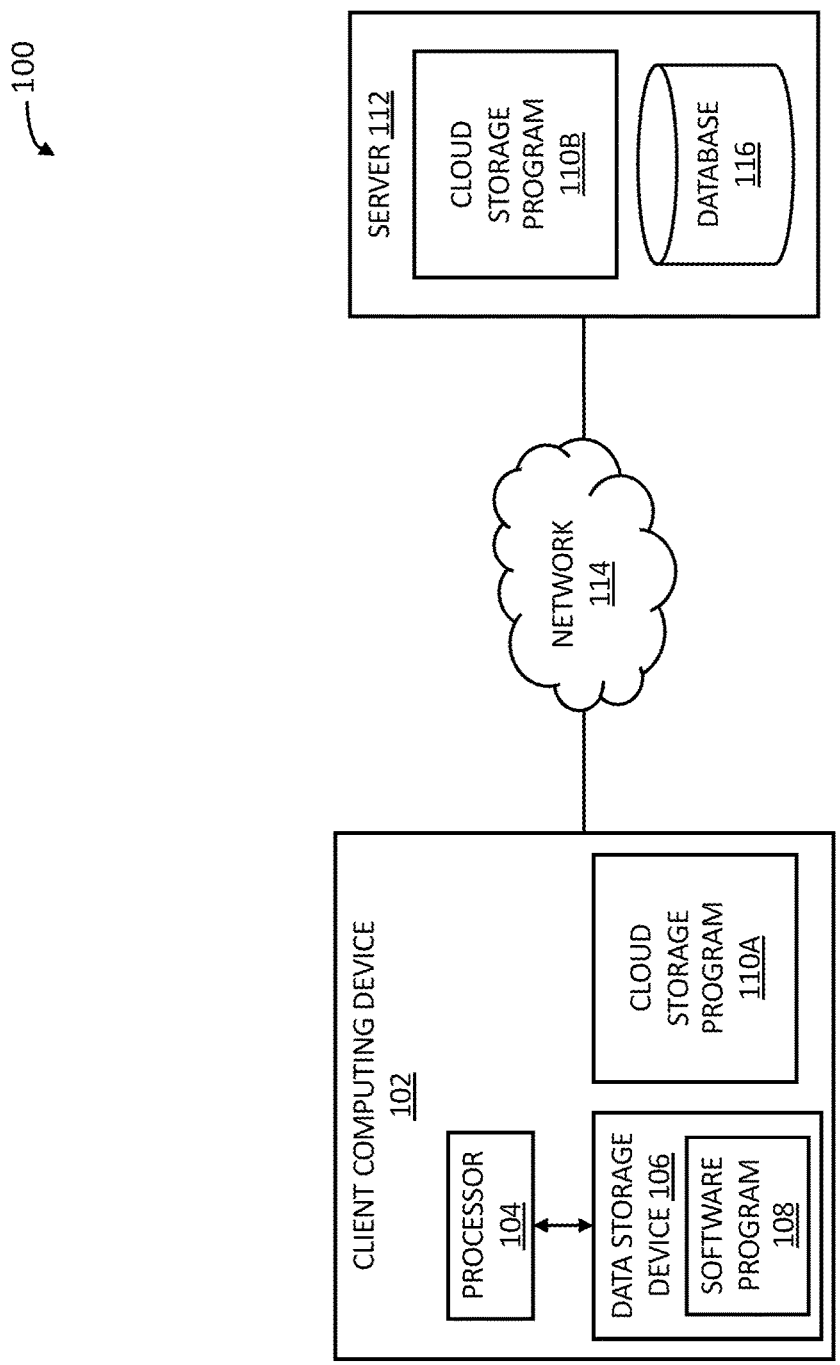
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to cloud storage. The following described exemplary embodiments provide a system, method, and program product to, among other things, analyze content and associated metadata of a data file which is being created or modified by a user and, accordingly, identify and present to the user a recommended cloud storage service provider folder location in which to store the data file, as well as recommended target users and permissions to be associated with the data file, based on cloud storage policies and requirements of the user. Therefore, the present embodiment has the capacity to improve the technical field of enterprise cloud storage by dynamically identifying an appropriate cloud storage service provider and corresponding folder location for storage of data based on cloud storage requirements of the enterprise, thus promoting compliance with enterprise or governmental cloud storage requirements and improving accessibility of data stored within a cloud storage service provider.

As previously described, CS is a model of computer data storage in which digital data is stored in logical pools in an off-site location that is accessible either through the public internet or a dedicated private network connection. The physical storage may span multiple servers, sometimes in multiple locations, and the physical environment is typically owned and managed by a third-party cloud provider who manages and operates data storage as a service. The CSSP is responsible for keeping the data available and accessible on-demand, as well as keeping the physical environment secured and running. Cloud storage services may be accessed through a cloud computing service, a web service API, or by applications that utilize the API. Organizations may buy or lease storage capacity from a CSSP to store organization or application data.

Within an enterprise cloud environment, an enterprise may often utilize multiple CSSPs storing various file types and media contents in various folders. Moreover, these CSSPs may implement different storage types (e.g., a storage area network (SAN) or network attached storage (NAS)) across different cloud data center locations for multi-user access and may offer different cloud storage options such as varying storage tiers having different input/output operations per second (IOPs) capabilities and access speeds. A user attempting to locate a specific folder within a specific CSSP for storage of a data file in current use by the user may find it difficult as the list of folders in an enterprise environment may be very extensive, thus making it difficult to locate the appropriate folder or causing redundant folders. Additionally, a data file created or modified by a user may be subject to various cloud storage requirements based on the content of the data file. For example, storage of a data file containing privacy or confidential content (e.g., personal data, medical data, financial data) may require a particular CSSP or storage data center location. As another example, storage of data files containing critical or frequently accessed information or multimedia data files (e.g., video files) may require storage with high performance capability. As yet another example, a cost associated with the storage of a data file may factor into the selection of a particular CSSP. The user may need to consider such requirements when selecting or creating a storage folder within a particular CSSP. It may therefore be imperative to have a system in place to analyze data file content being created or modified and present a user with a visualization of an appropriately identified CSSP and folder location in which to store the data file based on applicable cloud storage requirements (e.g., enterprise requirements, government regulations) and available CSSP capabilities. Thus, embodiments of the present invention may be advantageous to, among other things, evaluating cloud storage requirements and available CSSP capabilities, analyzing data file content being created or modified, performing contextual analysis of data files stored within available CSSPs, presenting a user with an appropriate CSSP and folder location for data file storage, creating a folder within a CSSP for data file storage where none exist, and assigning user access controls for a data file or CSSP folder location. The present invention does not require that all advantages need to be incorporated into every embodiment of the invention.

According to at least one embodiment, the proposed system may utilize natural language processing to analyze data file content being created or updated and perform a contextual analysis of data files stored in available CSSP folders to identify at least one CSSP and folder to store the data file content based on its content, cloud storage policies, and available CSSP capabilities. The proposed system may also identify appropriate users and permissions of the data file content. The identified at least one CSSP and folder for storage, as well as the identified users, may be presented to a user, via a visualization, for storage implementation or modification by the user. According to at least one other embodiment, if an existing folder for storage of data file content within an available CSSP is not identified, the proposed system may create a new folder within an available appropriately identified CSSP. The proposed system may also assign appropriate user access and roles to the newly created folder based on historical learning.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to evaluate data file or media content generation or update, and then identify and display an appropriate CSSP and corresponding folder location to store the data file or media content based on contextual analysis of data files stored in different folders of the CSSP, cloud storage policies, user country of origin, and capabilities of available CSSPs. The system, method, and program product additionally identifies and displays recommended user access for the data file/media content or folder location. If an appropriate CSSP and corresponding folder location cannot be identified, a new folder within an available CSSP may be created.

Referring to FIG. 1, an exemplary networked computer environment 100 is depicted, according to at least one embodiment. The networked computer environment 100 may include a client computing device 102 and a server 112, interconnected via a communication network 114. According to at least one implementation, the networked computer environment 100 may include a plurality of client computing devices 102 and servers 112, of which only one of each is shown for illustrative brevity. Additionally, in one or more embodiments, the client computing device 102 and the server 112 may each host a cloud storage program 110A, 110B. In one or more other embodiments, the cloud storage program 110A, 110B may be partially hosted on client computing device 102 and server 112 so that functionality may be separated among the devices.

The communication network 114 may include various types of communication networks, such as a wide area network (WAN), local area network (LAN), a telecommunication network, a wireless network, a public switched network and/or a satellite network. The communication network 114 may include connections, such as wired or wireless communication links or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a cloud storage program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a cloud storage program 110B and a database 116 and communicating with the client computing device 102 via the communication network 114, in accordance with embodiments of the invention. As will be discussed with reference to FIG. 3, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the cloud storage program 110A, 110B may be a program capable of contextually analyzing data files stored within available CSSPs, creating and maintaining a knowledge corpus of available CSSPs having correlations between data file context and CSSP storage folder locations and permissioned users, analyzing content of a data file being created or modified as well as its related metadata, identifying enterprise or government policies for data file cloud storage, identifying or modifying permissioned users with varying levels of access to be associated with a data file or CSSP folder, and displaying existing or new CSSP storage recommendations/solutions for data file storage. The cloud storage program 110A, 110B may be implemented as a stand-alone application, as a plug-in to known productivity software applications, as a plug-in to an existing CSSP API, or as a logical overlay file system positioned in front of the physical CSSP. The cloud storage location identification method is explained in further detail below with respect to FIG. 2.

Figure 2:
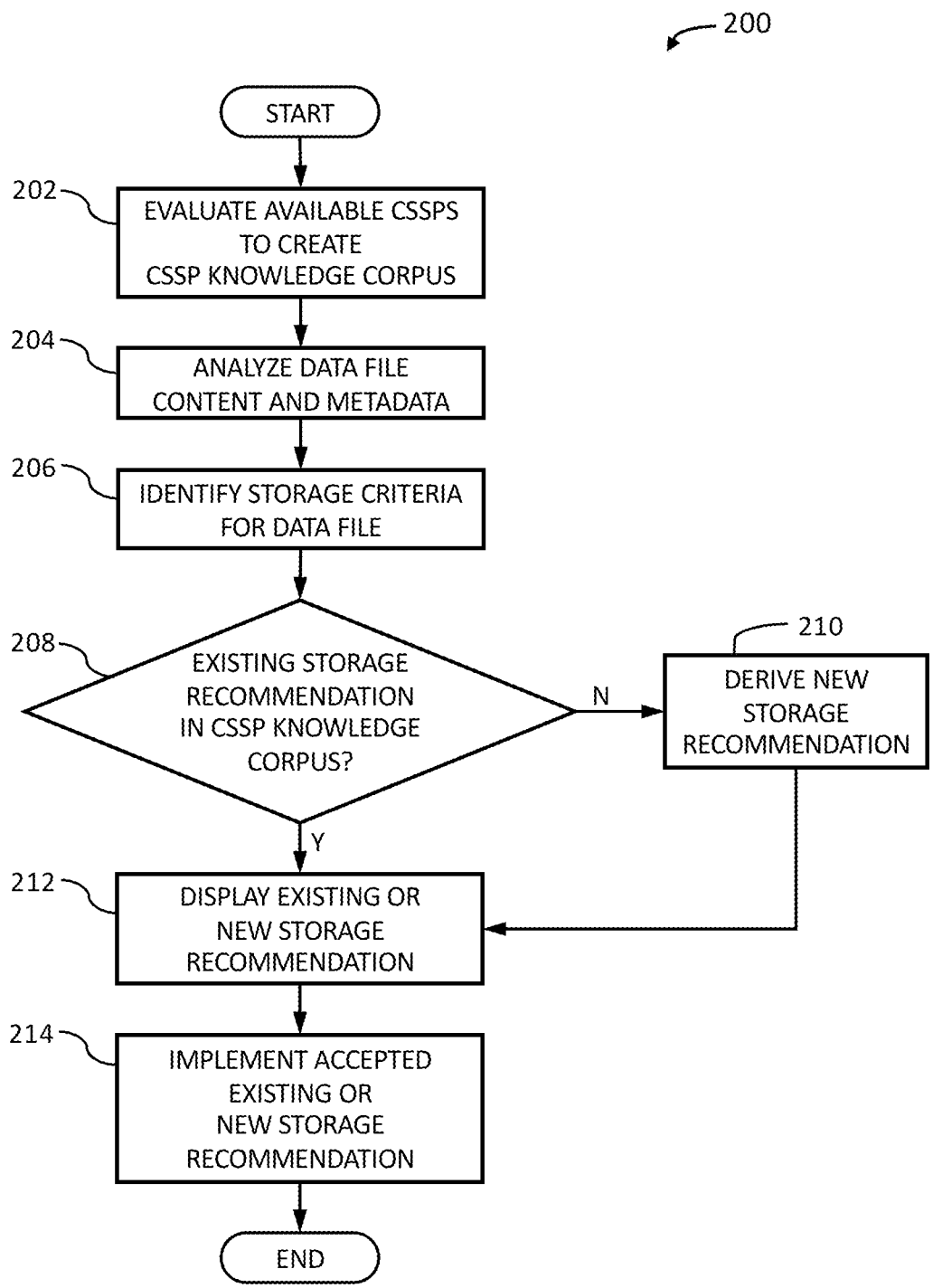
FIG. 2 illustrates an operational flowchart for identifying one or more cloud storage locations for a data file in a cloud storage location identification process according to at least one embodiment.

Referring now to FIG. 2, an operational flowchart for identifying one or more cloud storage locations for a data file in a cloud storage location identification process 200 is depicted according to at least one embodiment. At 202, the cloud storage (CS) program 110A, 110B evaluates available CSSPs to create a CSSP knowledge corpus of derived storage practices and policies. The available CSSPs may include any CSSP accessible by a user within an enterprise cloud environment. In evaluating available CSSPs, the CS program 110A, 110B performs natural language processing (NLP) on text of data files, and any related metadata, to identify details/attributes of each data file stored within an available CSSP including data file content and context, permissioned users, storage folder location, and any applicable storage policies (e.g., enterprise or government policies regulating cloud storage of data file content). In cases where data files are not text-based (e.g., audio or video files), the CS program 110A, 110B may extract text via known speech-to-text techniques. Furthermore, for each available CSSP, the CS program 110A, 110B identifies existing storage structures/hierarchies and corresponding user permissions. For example, the CS program 110A, 110B may identify one or more logical folder hierarchies within an available CSSP, as well as identify user details (e.g., number of users having folder access, roles of users, access levels/permissions of users, names of users, and locations of users) associated with folders of the one or more logical folder hierarchies. Based on the identified data file details, storage structures, and user permissions, the CS program 110A, 110B identifies, for each available CSSP and their respective data files, contextual correlations between data file content types (e.g., medical data, personal data, financial data, shareholder data, confidential data) and storage folder locations and contextual correlations between data file content types and permissioned users. Additionally, at 202, the CS program 110A, 110B identifies attributes of each available CSSP including geographic location of physical storage (e.g., server location), available storage capacity, storage access performance metrics (e.g., IOPs), applied storage security measures, available storage types (e.g., SAN or NAS storage), available storage tiers, and costs associated with available storage tiers. The CS program 110A, 110B may integrate the information identified above for each available CSSP (i.e., data file details, storage structures, user permissions, correlations, and CSSP attributes) within a searchable CSSP knowledge corpus which may be stored within data storage device 106 or database 116.

According to at least one embodiment, the CS program 110A, 110B may utilize historical learning of user feedback/actions relating to defined or selected user roles/permissions (e.g., owner, author, read/write, read-only) for different data file content types when identifying users and permissions for a data file. According to at least one other embodiment, data file content or metadata of a data file may indicate association with a particular project and the CS program 110A, 110B may access an external data source (e.g., a project database lookup) to identify users, and corresponding access levels/roles, for the data file. According to another embodiment, the CS program 110A, 110B may require a user opt-in for each available CSSP to be evaluated as described above.

At 204, the CS program 110A, 110B, performs NLP on a data file text currently being created or updated by a user in order to analyze and identify content of the data file. The CS program 110A, 110B also analyzes, via NLP, any metadata associated with the data file in furtherance of identifying content and context of the data file. In cases where data files are not text-based, the CS program 110A, 110B may extract text from the data file. Additionally, at 204, the CS program 110A, 110B may identify activities of the user before or during the data file creation or update in order to identify further content or context of the data file. For example, the CS program 110A, 110B may access calendar information of the user which includes scheduled meeting/activity times and descriptions. Context or content of a data file created or updated by the user during a scheduled meeting/activity for a particular topic may be identified, by the CS program 110A, 110B, as relating to the particular topic. According to at least one embodiment, the CS program 110A, 110B may be a plug-in to the software program 108, which may be a productivity software application (e.g., a word processing application, a presentation application, a spreadsheet application) and NLP of the data file and its metadata may be triggered by a write operation performed on the data file within the productivity software application. According to another embodiment, the CS program 110A, 110B may be implemented as a logical overlay file system, positioned in front of physical servers of a CSSP, which intercepts data file save operations and performs NLP of the data file and its metadata. The logical overlay file system may be integrated into an operating system of the client computing device 102 or the server 112. According to yet another embodiment, the CS program 110A, 110B may identify a physical location or an origin location of the user indicating where the user is creating or updating a data file and classify the data file accordingly. For example, the CS program 110A, 110B may access location services information (e.g., Wi-Fi or global positioning system data) of a device being used by the user to create or update a data file and identify that the user is located in a secure customer location. Consequently, the CS program 110A, 110B may classify (e.g., add one or more metadata tags) the data file as related to the customer and/or confidential. Moreover, the CS program 110A, 110B may also identify a virtual location of the user indicating where the user is creating or updating a data file and classify the data file accordingly. For example, if the user is attending a meeting in a virtual reality or web conferencing environment, the CS program 110A, 110B may identify the user's data file editing in such an environment and classify the data file accordingly.

At 206, the CS program 110A, 110B identifies cloud storage criteria for the data file being created or updated. In identifying the cloud storage criteria for the data file, the CS program 110A, 110B evaluates the natural language processed content of the data file, as well as metadata of the data file, to identify attributes of the data file and associated cloud storage criteria including country of data file origin, physical or virtual location of the user creating or updating the data file, applicable enterprise or government cloud storage policies based on data file content (e.g., policies regulating the cloud storage of privacy data, financial data, critical data, or confidential data). For example, content of the data file or its associated metadata may indicate that the data file is subject to geographic location restrictions for cloud storage servers since data file creation or update originated in a particular region or country or contains privacy information. As such, the data file must be stored in a CSSP with servers located in the EU. Attributes of the data file and associated cloud storage criteria may also include defined permissioned users and user roles having access to the data file, data file storage performance requirements (e.g., required access speeds) based on data file content, and data file storage cost considerations (e.g., cloud storage budget restrictions) based on data file content. According to another embodiment, data file content or metadata of a data file may indicate association with a particular project and the CS program 110A, 110B may access an external data source (e.g., a project database lookup) to identify attributes of the data file and associated cloud storage criteria.

Next, at 208, the CS program 110A, 110B determines whether any existing contextual correlations (e.g., existing storage solutions) within the CSSP knowledge corpus are applicable to the data file being created or updated. In making this determination, the CS program 110A, 110B compares the data file and metadata content, data file attributes, and cloud storage criteria, identified above at steps 204 and 206, with the information stored within the CSSP knowledge corpus, created at step 202, to identify any contextual similarities between the data file being created or updated and a previously created data file already being stored within a folder location of an available CSSP. For example, if the CS program 110A, 110B determines, using NLP, that the content of the data file being created or updated matches, to a threshold amount, the content of a previously created data file already being stored within a folder location of an available CSSP, the CS program 110A, 110B may apply the contextual correlations identified for the previously created data file (i.e., contextual correlation between data file content type and storage folder location and contextual correlation between data file content type and permissioned users) to the data file being created or updated. A threshold amount for content matching may be a threshold number of matching keywords between two data files or a threshold number of matching metadata tags between two data files. In response to determining that one or more existing contextual correlations within the CSSP knowledge corpus are applicable to the data file being created or updated (step 208, "Y" branch), the cloud storage location identification process 200 may proceed to step 212. In response to determining that no existing contextual correlations within the CSSP knowledge corpus are applicable to the data file being created or updated (step 208, "N" branch), the cloud storage location identification process 200 may proceed to step 210.

At 210, the CS program 110A, 110B derives a new storage recommendation for the data file being created or updated. More specifically, in response to determining that no existing contextual correlations within the CSSP knowledge corpus are applicable to the data file being created or updated, and thus an existing storage recommendation is not applicable, the CS program 110A, 110B creates or proposes a new folder location, within an appropriately identified CSSP of the available CSSPs evaluated in step 202, in which to store the data file being created or updated. Identification of the appropriate CSSP, the folder location (e.g., folder hierarchy) within the CSSP, and a name for the new folder may be based on the data file and metadata content, data file attributes, and cloud storage criteria identified above at steps 204 and 206. For example, the CS program 110A, 110B evaluates data content, performance requirements (e.g., a minimum required IOPs), and cost considerations (e.g., an enterprise cloud storage budget) of the data file being created or updated when identifying an appropriate CSSP and corresponding storage folder location. An appropriate CSSP is one that satisfies the identified storage criteria (e.g., one that provides storage with the required performance capability within the enterprise cloud storage budget). Identification of the appropriate CSSP, the folder location within the CSSP, and the name for the new folder may also be based on contextual similarities between the data file being created or updated and previously created data files already being stored within folder locations of available CSSP. For example, if the content of a previously created data file stored within a folder location of an available CSSP and the content of the data file being created or updated are contextually similar in that they both include financial data, yet for differing years, the CS program 110A, 110B may identify the CSSP of the previously created data file as the appropriate CSSP and propose a new folder, within the same folder hierarchy and at the same hierarchy level as the folder storing the previously created data file, labeled with the financial data year covered by the content of the data file being created or updated. The contextual similarities that may influence the identification of the appropriate CSSP and corresponding folder location, may be those contextual similarities which were determined in step 208 to not match to the threshold amount.

In addition to identifying the appropriate CSSP of the available CSSPs and the corresponding storage folder location, at 210 the CS program 110A, 110B also identifies permissioned users, user access levels, and/or user roles to be associated with the new folder location or the data file being created or updated. Identification of the permissioned users, user access levels, or user roles may be based on information of the CSSP (i.e., stored data file details, storage structures, user permissions, correlations, and CSSP attributes) stored within the CSSP knowledge corpus, data file and metadata content, data file attributes, and cloud storage criteria identified above at steps 204 and 206, as well as historical learning of user feedback regarding user assignments/roles. For example, the CS program 110A, 110B may adjust (e.g., add missing users, remove users, modify access permissions and roles) user access levels and roles for the new folder location or the data file being created or updated, based on analysis of contextually similar data file contents in other folders of the identified CSSP, analysis of folder permissions for those other folders, and analysis of data content and attributes of the data file being created or updated.

According to at least one other embodiment, based on attributes of the appropriately identified CSSP, as well as data file and metadata content and cloud storage criteria of the data file being created or updated, the CS program 110A, 110B may contextually split the content of the data file being created or updated so that it may be stored across multiple folder locations of the CSSP and/or across multiple data center locations of one or more appropriate CSSPs. For example, non-financial data content may be stored within one folder of the CSSP, and financial data content may be stored within another folder of the CSSP. As another example, in cases where the user country of origin is the EU, personal data of users may be stored within a folder of an appropriate CSSP with a data center in the EU, whereas non personal data may be stored within a folder of a second appropriately identified CSSP.

According to yet another embodiment, the CS program 110A, 110B may identify a length of time for which to share a data file based on content of the data file or based on an retention policy of the enterprise. For example, if a data file is identified as having confidential data (e.g., human resources data, financial data, etc.) and a user specifies a 5-day sharing duration, the CS program 110A, 110B may record that sharing duration and propose it for future data files having confidential content.

At 212, the CS program 110A, 110B displays an existing storage recommendation or a new storage recommendation to a user. In a situation where it was determined, at step 208, that one or more existing contextual correlations within the CSSP knowledge corpus were applicable to the data file being created or updated, the CS program 110A, 110B displays an existing storage recommendation (i.e., CSSP, folder location, and user permissions) for adoption by the user when storing the data file being created or updated. For example, if content of a previously created data file and content of the data file being created or updated were determined to match to a threshold amount, the CS program 110A, 110B would display the storage options (i.e., CSSP, folder location, and user permissions) of the previously created data file for the user to implement when storing the data file being created or updated. In a situation where it was determined, at step 208, no existing contextual correlations within the CSSP knowledge corpus are applicable to the data file being created or updated, the CS program 110A, 110B displays the new storage recommendation (i.e., appropriately identified CSSP, folder location, and user permissions), derived at step 210, for adoption by the user when storing the data file being created or updated. In displaying the existing or new storage recommendation to the user, the CS program 110A, 110B may create and overlay a visualization which includes information/details of the storage recommendation as options for the user to select or modify within a header of the data file being created or updated. According to an embodiment where the CS program 110A, 110B is implemented a plug-in to a productivity software application, the visualization may be displayed as menu within the productivity software application. According to an embodiment where the CS program 110A, 110B is implemented as a logical overlay file system, the visualization may be displayed as a menu within the file system.

At 214, the CS program 110A, 110B implements the storage recommendation (i.e., either an existing recommendation or a new recommendation) accepted by the user for storing the data file being created or updated. As noted in step 212, the visualization displayed to the user includes information/details of the storage recommendation as options for the user to select or modify, thus, at 214, the user may accept the storage recommendation as displayed in the visualization without modification or the user may modify one or more aspects of the storage recommendation (e.g., CSSP selection, folder name/location, permissioned users and roles) before accepting it for storage of the data file being created or updated. Additionally at 214, the CS program 110A, 110B may track user actions associated with the storage recommendation (e.g., acceptance of the storage recommendation without modification, acceptance of the storage recommendation with modification) and update the CSSP knowledge corpus with the above identified information of the data file being created or updated as well as information of its implemented storage recommendation. In at least one embodiment, the CS program 110A, 110B may require the user to opt-in to usage of the CS program 110A, 110B or to the user action tracking by the CS program 110A, 110B.

It may be appreciated that FIG. 2 provides only an illustration of one implementation and do not imply any limitations with regard to how different embodiments may be implemented. Many modifications to the depicted environments may be made based on design and implementation requirements.

Figure 3:
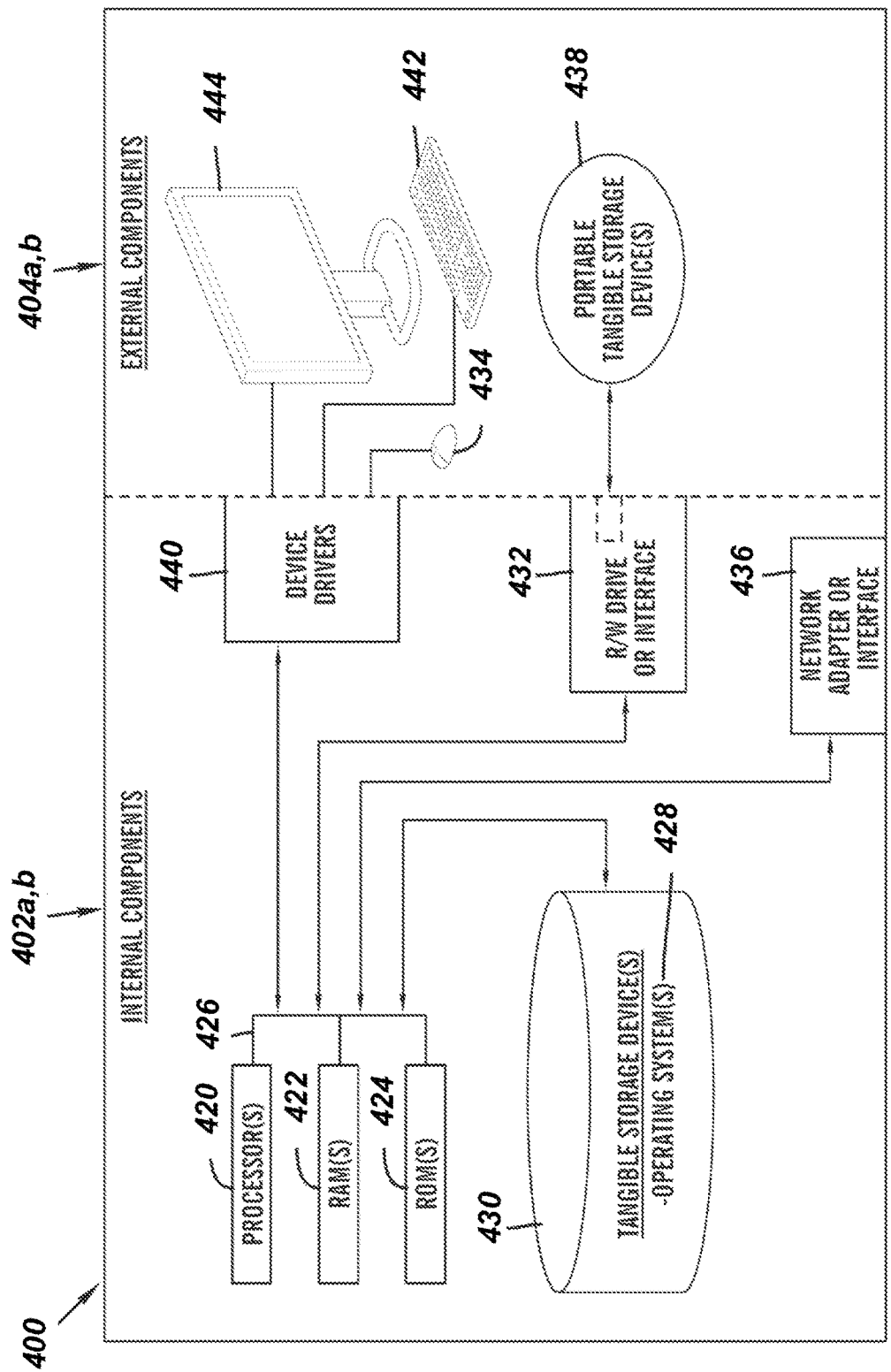
FIG. 3 is a functional block diagram of internal and external components of computers and servers depicted in FIG. 1 according to at least one embodiment.

FIG. 3 is a block diagram 400 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, IoT devices, and distributed cloud computing environments that include any of the above systems or devices.

The client computing device 102 and the server 112 may include respective sets of internal components 402 a,b and external components 404 a,b illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the CS program 110A in the client computing device 102, and the CS program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 3, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the CS program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the CS program 110A in the client computing device 102 and the CS program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the CS program 110A in the client computing device 102 and the CS program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor

444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
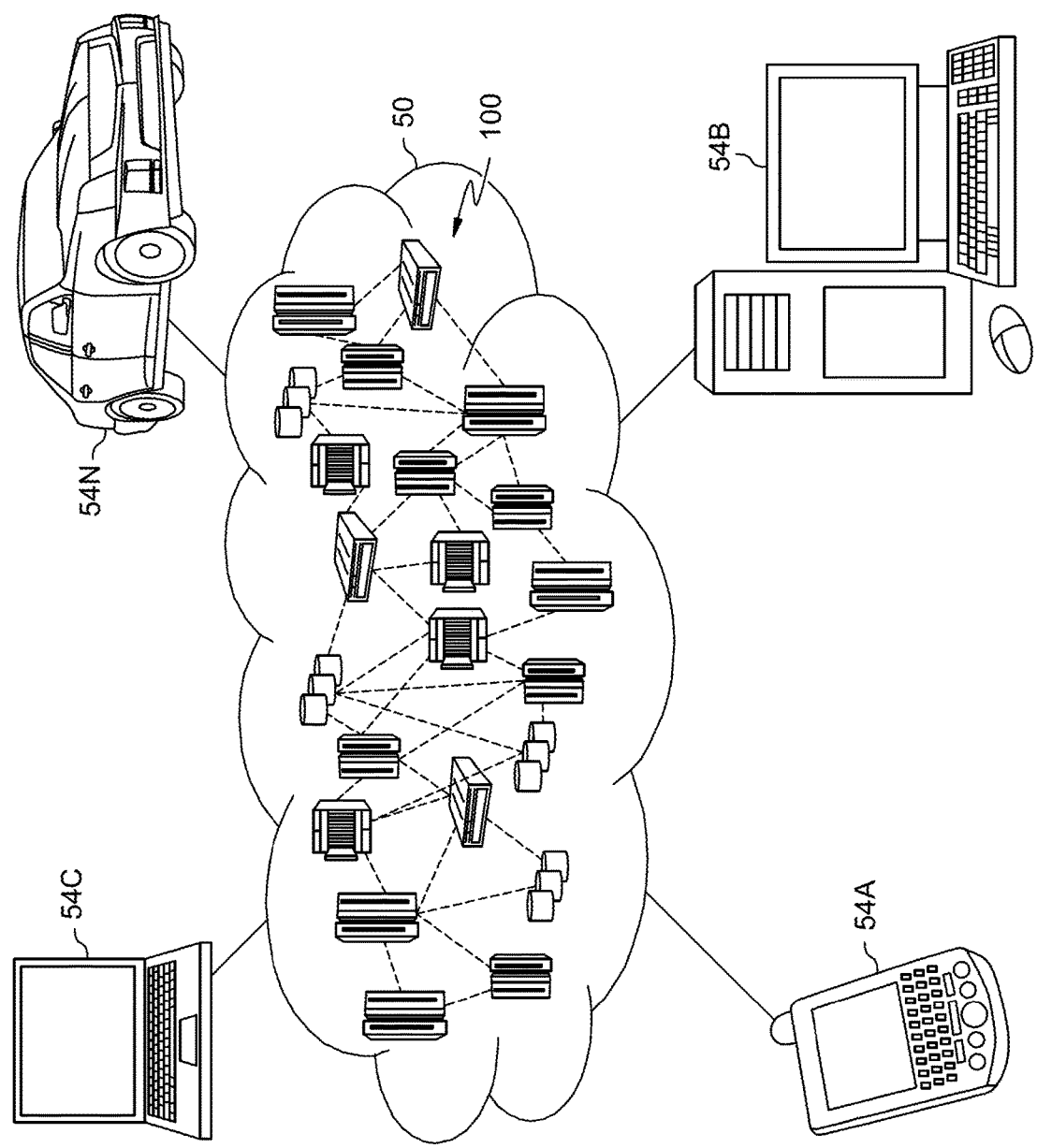
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
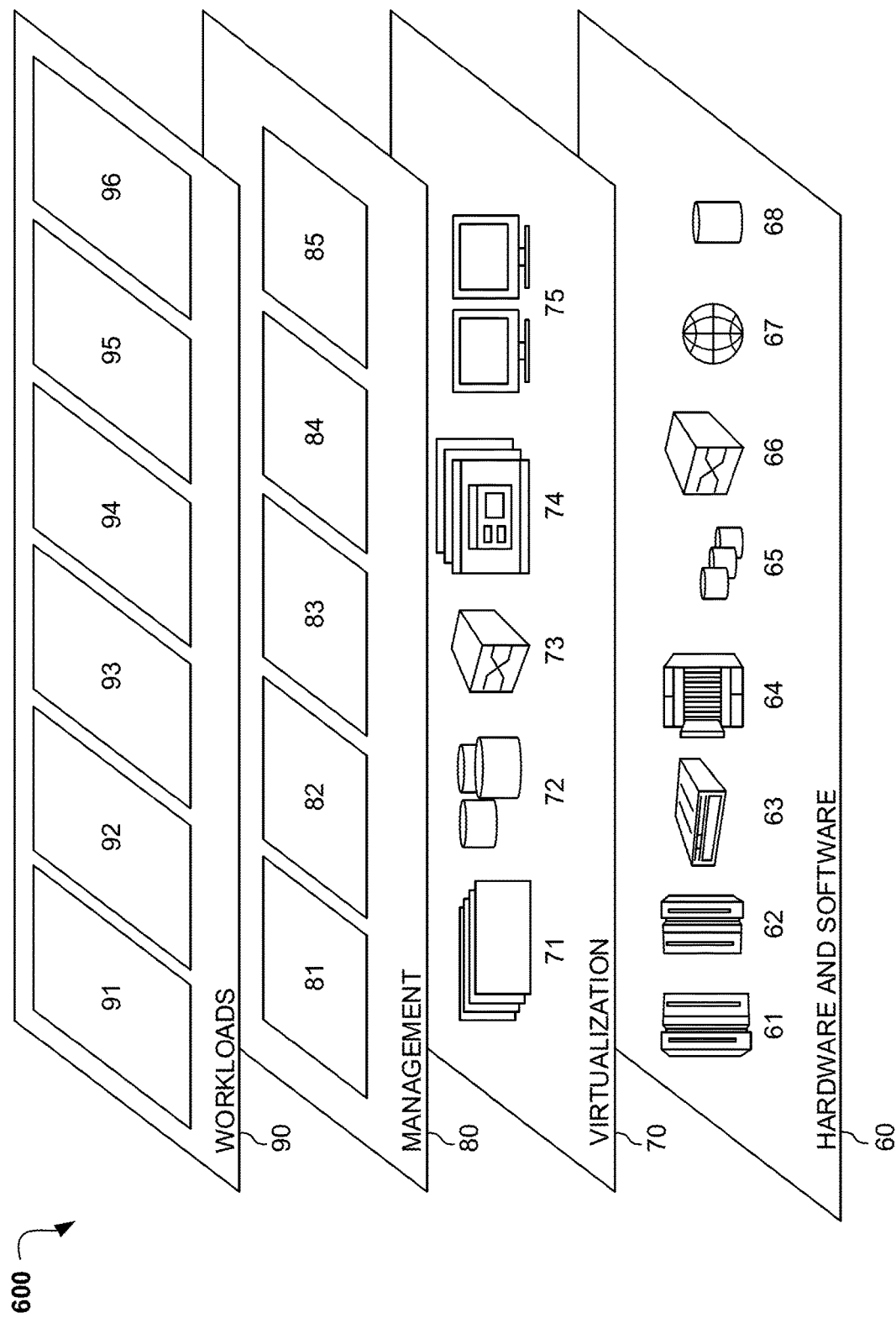
FIG. 5 depicts abstraction model layers according to an embodiment of the present invention.

Referring now to FIG. 5, a set of functional abstraction layers 600 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud storage 96. Cloud storage 96 may relate to evaluating the contents of a data file and contextually analyzing existing cloud storage provider folders and users to predict an appropriate cloud storage provider and folder to store the data file with appropriate user access.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of identifying cloud storage destination, the method comprising:
    identifying content of a data file being created or updated;
    identifying cloud storage criteria of the data file;
    determining whether an existing storage solution within a cloud storage service provider (CSSP) knowledge corpus is applicable to the data file;
    in response to determining that an existing storage solution is not applicable to the data file, creating a new storage solution for the data file based on the identified content and cloud storage criteria of the data file; and
    displaying, within a header of the data file, a visualization comprising details of the new storage solution as options for a user to accept or modify, wherein the details comprise an identified available CSSP for storage of the data file, an identified storage folder location within the available CSSP, and one or more permissioned users of the identified storage folder location or the data file.

2. The method of claim 1, further comprising:
    identifying on or more content types and attributes of previously created data files, and related metadata, stored in available CSSPs;
    identifying existing storage hierarchies and corresponding permissioned users of the available CSSPs;
    identifying, for each available CSSP, contextual correlations between identified content types and storage folder locations;
    identifying, for each available CSSP, contextual correlations between identified content types and permissioned users;
    identifying attributes of the available CSSPs; and
    creating the CSSP knowledge corpus, wherein the CSSP knowledge corpus comprises, for each available CSSP, the identified one or more content types and attributes of stored previously created data files, the identified existing storage hierarchies and corresponding permissioned users, the identified contextual correlations, and the identified attributes.

3. The method of claim 1, further comprising:
    in response to determining that an existing storage solution is applicable to the data file, displaying, within a header of the data file, a visualization comprising details of the existing storage solution as options for the user to accept or modify;
    implementing an accepted existing storage solution or an accepted new storage solution for storage of the data file; and
    updating the CSSP knowledge corpus with storage implementation information of the data file.

4. The method of claim 1, wherein the identifying content of the data file comprises performing natural language processing on text of the data file and on text of metadata of the data file.

5. The method of claim 1, wherein the determining whether an existing storage solution within the CSSP knowledge corpus is applicable to the data file comprises determining a contextual similarity between the data file and a previously created data file stored within an available CSSP.

6. A computer system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        identifying content of a data file being created or updated;
        identifying cloud storage criteria of the data file;
        determining whether an existing storage solution within a cloud storage service provider (CSSP) knowledge corpus is applicable to the data file;

in response to determining that an existing storage solution is not applicable to the data file, creating a new storage solution for the data file based on the identified content and cloud storage criteria of the data file; and displaying, within a header of the data file, a visualization comprising details of the new storage solution as options for a user to accept or modify, wherein the details comprise an identified available CSSP, a storage folder location within the CSSP, and permissioned user(s) of the data file.

7. The computer system of claim 6, further comprising:

identifying on or more content types and attributes of previously created data files, and related metadata, stored in available CSSPs;

identifying existing storage hierarchies and corresponding permissioned users of the available CSSPs;

identifying, for each available CSSP, contextual correlations between identified content types and storage folder locations;

identifying, for each available CSSP, contextual correlations between identified content types and permissioned users;

identifying attributes of the available CSSPs; and creating the CSSP knowledge corpus, wherein the CSSP knowledge corpus comprises, for each available CSSP, the identified one or more content types and attributes of stored previously created data files, the identified existing storage hierarchies and corresponding permissioned users, the identified contextual correlations, and the identified attributes.

8. The computer system of claim 6, further comprising:

in response to determining that an existing storage solution is applicable to the data file, displaying, within a header of the data file, a visualization comprising details of the existing storage solution as options for the user to accept or modify;

implementing an accepted existing storage solution or an accepted new storage solution for storage of the data file; and updating the CSSP knowledge corpus with storage implementation information of the data file.

9. The computer system of claim 6, wherein the identifying content of the data file comprises performing natural language processing on text of the data file and on text of metadata of the data file.

10. The computer system of claim 6, wherein the determining whether an existing storage solution within the CSSP knowledge corpus is applicable to the data file comprises determining a contextual similarity between the data file and a previously created data file stored within an available CSSP.

11. A computer program product, the computer program product comprising:

one or more computer-readable tangible storage medium and program instructions stored on at least one of the one or more tangible storage medium, the program instructions executable by a processor capable of performing a method, the method comprising:

identifying content of a data file being created or updated;

identifying cloud storage criteria of the data file;

determining whether an existing storage solution within a cloud storage service provider (CSSP) knowledge corpus is applicable to the data file;

in response to determining that an existing storage solution is not applicable to the data file, creating a new storage solution for the data file based on the identified content and cloud storage criteria of the data file; and displaying, within a header of the data file, a visualization comprising details of the new storage solution as options for a user to accept or modify, wherein the details comprise an identified available CSSP, a storage folder location within the CSSP, and permissioned user(s) of the data file.

12. The computer program product of claim 11, further comprising:

identifying on or more content types and attributes of previously created data files, and related metadata, stored in available CSSPs;

identifying existing storage hierarchies and corresponding permissioned users of the available CSSPs;

identifying, for each available CSSP, contextual correlations between identified content types and storage folder locations;

identifying, for each available CSSP, contextual correlations between identified content types and permissioned users;

identifying attributes of the available CSSPs; and creating the CSSP knowledge corpus, wherein the CSSP knowledge corpus comprises, for each available CSSP, the identified one or more content types and attributes of stored previously created data files, the identified existing storage hierarchies and corresponding permissioned users, the identified contextual correlations, and the identified attributes.

13. The computer program product of claim 11, further comprising:

in response to determining that an existing storage solution is applicable to the data file, displaying, within a header of the data file, a visualization comprising details of the existing storage solution as options for the user to accept or modify;

implementing an accepted existing storage solution or an accepted new storage solution for storage of the data file; and updating the CSSP knowledge corpus with storage implementation information of the data file.

14. The computer program product of claim 11, wherein the identifying content of the data file comprises performing natural language processing on text of the data file and on text of metadata of the data file.

15. The computer program product of claim 11, wherein the determining whether an existing storage solution within the CSSP knowledge corpus is applicable to the data file comprises determining a contextual similarity between the data file and a previously created data file stored within an available CSSP.

* * * * *